United States Patent
Zhou et al.

(10) Patent No.: US 11,704,361 B2
(45) Date of Patent: Jul. 18, 2023

(54) METHOD, APPARATUS AND STORAGE MEDIUM FOR IMPLEMENTING A DISCRETE FRAME-BASED SCENE SECTION

(71) Applicant: APOLLO INTELLIGENT DRIVING TECHNOLOGY (BEIJING) CO., LTD., Beijing (CN)

(72) Inventors: Jing Zhou, Beijing (CN); Guo Song, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 95 days.

(21) Appl. No.: 16/943,257

(22) Filed: Jul. 30, 2020

(65) Prior Publication Data

US 2021/0042348 A1 Feb. 11, 2021

(30) Foreign Application Priority Data

Aug. 5, 2019 (CN) .......................... 201910716456.0

(51) Int. Cl.
*G06F 16/738* (2019.01)
*G06F 16/78* (2019.01)
*G06F 18/22* (2023.01)

(52) U.S. Cl.
CPC ........ *G06F 16/739* (2019.01); *G06F 16/7867* (2019.01); *G06F 18/22* (2023.01)

(58) Field of Classification Search
CPC ............................ G06F 16/7867; G06F 16/787
See application file for complete search history.

(56) References Cited

U.S. PATENT DOCUMENTS

| | | | |
|---|---|---|---|
| 9,313,429 B1* | 4/2016 | Myers | G06T 5/003 |
| 9,715,901 B1 | 7/2017 | Singh et al. | |
| 10,594,940 B1* | 3/2020 | Persiantsev | H04N 5/23267 |
| 2003/0050929 A1* | 3/2003 | Bookman | G06F 16/30 |
| 2006/0190290 A1 | 8/2006 | Gomez | |
| 2007/0078777 A1 | 4/2007 | Demartini et al. | |
| 2007/0112676 A1 | 5/2007 | Kontio et al. | |

(Continued)

FOREIGN PATENT DOCUMENTS

| | | |
|---|---|---|
| WO | 2007131132 A2 | 11/2007 |
| WO | 2007131132 A3 | 11/2007 |
| WO | 2017205812 A1 | 11/2017 |

OTHER PUBLICATIONS

Extended European Search Report from EP app. No. 20167301.9, dated Oct. 22, 2020.

*Primary Examiner* — Vaishali Shah
(74) *Attorney, Agent, or Firm* — Ladas & Parry, LLP

(57) ABSTRACT

A method, apparatus and storage medium for implementing a discrete frame-based scene section are disclosed. The method comprises: obtaining at least one first tag for mapping a discrete frame to a scene section; for any second tag in the at least one first tag, performing polling query on to-be-processed first discrete frames respectively to determine whether there is a second discrete frame matched with the second tag in the first discrete frames; if there is the second discrete frame, marking the second discrete frame with the second tag corresponding to a scene section; if the polling query corresponding to the second tag ends, storing start frame timestamp information and end frame timestamp information of the scene section.

20 Claims, 4 Drawing Sheets

(56) References Cited

U.S. PATENT DOCUMENTS

| | | | |
|---|---|---|---|
| 2007/0201694 A1* | 8/2007 | Bolle | G06T 1/0021 |
| | | | 380/205 |
| 2010/0030744 A1* | 2/2010 | DeShan | H04L 67/02 |
| | | | 715/764 |
| 2014/0040222 A1* | 2/2014 | Schmitz | G06V 20/46 |
| | | | 707/705 |
| 2017/0345178 A1* | 11/2017 | Lin | H04N 21/8146 |
| 2019/0356897 A1* | 11/2019 | Karivaradaswamy | |
| | | | H04N 21/23608 |
| 2020/0244917 A1* | 7/2020 | Rechner | G06T 7/0002 |

* cited by examiner

```
Frame                              Tag configuration
{                                  {
    "sys": {                           "sys": {                                      Section
        "create_time": "create time"       "create_time": "create time"              {
        "update_time": "update time"       "create_user": "create user"                  "sys": {
    },                                     "category": "tag type"                            "create_time": "create time"
    "meta": {                          },                                                    "update_time": "update time"
    //Solely identify a frame          "meta": {                                             "type": "section type"
        "time stamp": "timestamp of a      "parent_type": "parent tag                    },
frame (nanosecond)",               type"                                                 "meta": {
        "travel_id": "task id"             "parent_type_symbol":                             "begin_time": "begin time of the
    },                             "parent tag name"                                 section"
    "tag": {                           "type": "tag type"                                "end_time": "end time of the
    //2_1=Parent tag type_child tag        "type_symbol": "tag name"                 section"
type                                   "description":          "tag                 //Solely describes one travel task of
    //Correspond to parent_type_type   description"                                  the autonomous vehicle
in the tag configuration               },                                                "travel_id": "task id"
        "2_1":"tag value"              "merge": {                                        },
        "3_2":"tag value"//a frame may     "rule":    "calculation   rule                "tag": {
include a plurality of tags        (threshold/range)"                                //6_2=Parent tag type_child tag
    }                                  //Rule data                                type
}                                      "data": {                                         //Correspond to parent_type_type
                                       //Rule key                                in the tag configuration
                                           "21_1": {                                      "6_2":"tag value"
                                               "min": 0, //minimum value                  }
of a range                                                                            }
                                               "max": 0, //maximum value
of a range
                                           }
                                       }
                                   }
```

FIG. 2

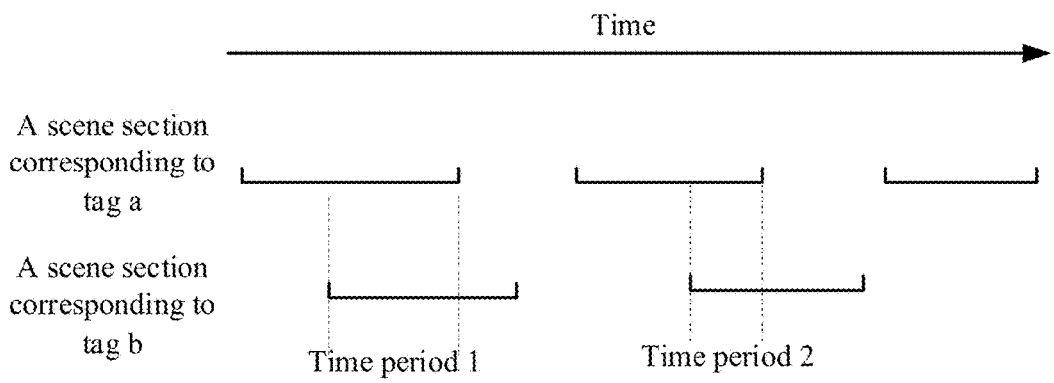

FIG. 3

METHOD, APPARATUS AND STORAGE MEDIUM FOR IMPLEMENTING A DISCRETE FRAME-BASED SCENE SECTION

The present application claims the priority of Chinese Patent Application No. 201910716456.0, filed on Aug. 5, 2019, with the title of "Method, apparatus and storage medium for implementing a discrete frame-based scene section". The disclosure of the above applications is incorporated herein by reference in its entirety.

FIELD OF THE DISCLOSURE

The present disclosure relates to computer application technologies, and particularly to a method, apparatus and storage medium for implementing a discrete frame-based scene section.

BACKGROUND OF THE DISCLOSURE

Autonomous vehicles usually use an image acquisition device including a camera to acquire external images, and use the collected external images for subsequent decision control.

SUMMARY OF THE DISCLOSURE

The present disclosure provides a method, apparatus and storage medium for implementing a discrete frame-based scene section.

Specific technical solutions are as follows:

A method for implementing a discrete frame-based scene section, wherein the method comprises:

obtaining at least one first tag for mapping a discrete frame to a scene section;

for any second tag in the at least one first tag, performing polling query on to-be-processed first discrete frames respectively to determine whether there is a second discrete frame matched with the second tag in the first discrete frames;

if there is the second discrete frame, marking the second discrete frame with the second tag corresponding to a scene section;

if the polling query corresponding to the second tag ends, storing start frame timestamp information and end frame timestamp information of the scene section.

A scene section searching method, comprising:

obtaining a search request carrying at least one tag;

determining a scene section corresponding to the tag, wherein the scene section is formed by, after obtaining at least one first tag for mapping a discrete frame to the scene section:

performing polling query on to-be-processed first discrete frames respectively with respect to any second tag in the at least one first tag; and marking a second discrete frame with the second tag corresponding to the scene section, the second discrete frame exists in the first discrete frames and is matched with the second tag;

generating a search result according to the stored start frame timestamp information and end frame timestamp information of the scene section corresponding to the tag, and returning the search result.

An apparatus for implementing a discrete frame-based scene section, comprising: a first obtaining unit and a continuation unit;

the first obtaining unit is configured to obtain at least one first tag for mapping a discrete frame to a scene section;

the continuation unit is configured to, for any second tag in the at least one first tag, perform polling query on to-be-processed first discrete frames respectively to determine whether there is a second discrete frame matched with the second tag in the first discrete frames, and if there is the second discrete frame, mark the second discrete frame with the second tag corresponding to a scene section, and if the polling query corresponding to the second tag ends, store start frame timestamp information and end frame timestamp information of the scene section.

A scene section searching apparatus, comprising: a second obtaining unit and a second searching unit;

the second obtaining unit is configured to obtain a search request carrying at least one tag;

the second searching unit is configured to determine a scene section corresponding to the tag; the scene section is formed by, after obtaining at least one first tag for mapping a discrete frame to the scene section:

performing polling query on to-be-processed first discrete frames respectively with respect to any second tag in the at least one first tag; and marking a second discrete frame with the second tag corresponding to the scene section, wherein the second discrete frame exists in the first discrete frames and is matched with the second tag;

generate a search result according to the stored start frame timestamp information and end frame timestamp information of the scene section corresponding to the tag and return the search result.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, according to solutions of the present disclosure, when the scene section corresponding to the tag is stored, the start frame timestamp and end frame timestamp in the scene section may be stored, the discrete frames included in the scene section may be identified with the start frame timestamp and the end frame timestamp, so that dual storage of the discrete frames and the scene sections needn't be performed, thereby saving the storage resources and reducing the storage cost.

BRIEF DESCRIPTION OF DRAWINGS

FIG. 2 is a schematic diagram of a manner of storing a first tag, discrete frames and a scene section according to the present disclosure.

FIG. 3 is a schematic diagram of a determined intersection according to the present disclosure.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the embodiments described here are partial embodiments of the present disclosure, not all embodiments. Based on embodiments in the present disclosure, all other embodiments obtained by those having ordinary skill in the art without making inventive efforts all fall within the protection scope of the present disclosure.

In addition, it should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship What are usually formed by the image acquisition device are a series of discrete frames which are independent from each other. These frames include a lot of valuable information. However, the information included in a single frame is very limited and can only reflect the current static information. If the discrete frames can be made continuous to form a section having a corresponding tag, i.e., implement a discrete frame-based scene section, the value of data will grow exponentially.

In the prior art, after the scene section is formed, it is usually necessary to store both the discrete frames and the scene section, thereby bringing about dramatic increase of the storage cost. Since the autonomous vehicle can obtain a lot of data during travel, such increase of the storage cost is unacceptable.

Figure 1:
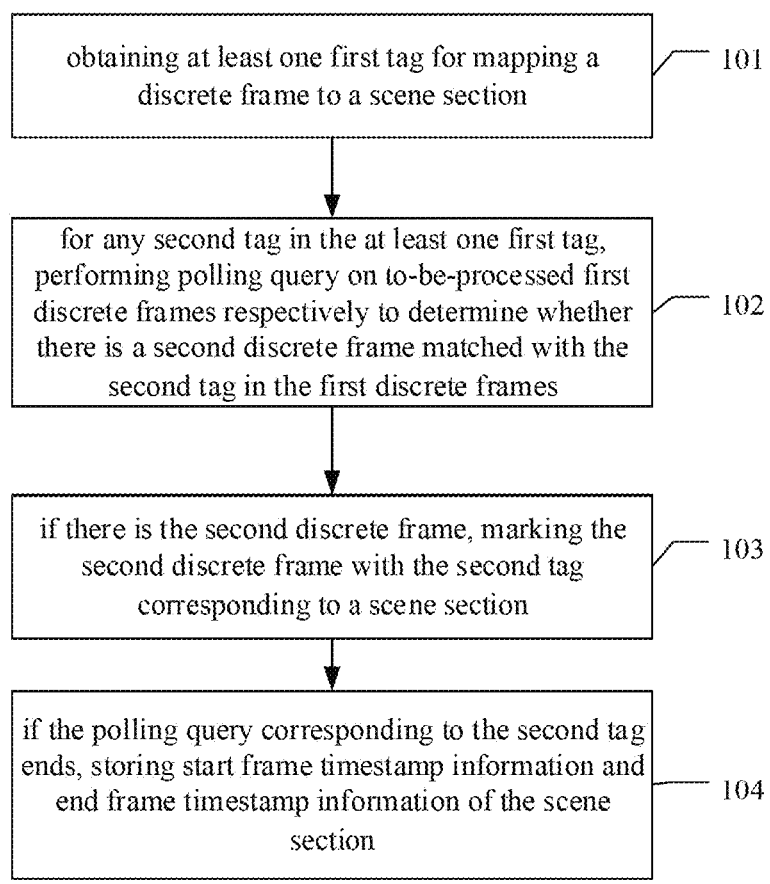
FIG. 1 is a flow chart of a method for implementing a discrete frame-based scene section according town embodiment of the present disclosure.

FIG. 1 is a flow chart of a method for implementing a discrete frame-based scene section according to an embodiment of the present disclosure. As shown in FIG. 1, the embodiment comprises the following specific implementation mode.

At 101, at least one first tag for mapping a discrete frame to a scene section is obtained.

At 102, for any second tag in the at least one first tag, perform polling query on to-be-processed first discrete frames respectively to determine whether there is a second discrete frame matched with the second tag in the first discrete frames.

At 103, if there is the second discrete frame, the second discrete frame is marked with the second tag corresponding to a scene section.

At 104, if the polling query corresponding to the second tag ends, start frame timestamp information and end frame timestamp information of the scene section are stored.

The at least one first tag for mapping, the discrete frames to the scene section may be obtained from a tag repository. The tag repository may be pre-created, and stores at least one first tag configured by the user. Each first tag is marked with whether to perform mapping from the discrete frames to the scene section, or it is believed by default that each first tag needs to perform mapping from the discrete frames to the scene section. The solution of the present embodiment is tag-driven, and the first tag in the tag repository may be configured flexibly according to actual needs.

The tag repository may further store a matching rule applicable for each first tag. Preferably, the matching rule may comprise range matching and threshold matching. When the matching rule applicable for a certain first tag is the range matching, the tag repository may further store a range of values corresponding to the first tag. When the matching rule applicable for a certain first tag is the threshold matching, the tag repository may further store a threshold corresponding to the first tag.

Each tag in the tag repository may be stored in the manner shown in FIG. 2. FIG. 2 is a schematic diagram of a manner of storing a first tag, a discrete frame and a scene section according to the present disclosure. As shown in FIG. 2, the storage of the first tag mainly includes three major portions: sys, meta and merge. Some system data are stored in sys. In the meta, a tag type (namely, tag ID), a tag name and description information of the tag may be stored, additionally a parent-child relationship between tags may be configured to more accurately define tags, and correspondingly a parent tag type (namely, an ID of a parent tag) and a parent tag name may further be stored. The merge indicates that the current tag needs to perform mapping from the discrete frame to the scene section, merge.rule represents the matching rule (namely, a computing rule) suitable for the current tag, and may be threshold matching or range matching. When it is the range matching, what are stored in merge.data may be a minimum value and a maximum value in a range of values. When it is the threshold matching, what is stored in the merge.data may be a threshold.

Specific tags in the tag repository and the parent-child relationship between tags may depend on actual needs. For example, in the field of autonomous driving, the tag repository may include but is not limited to the following tags: environment, obstacles, vehicle owner's behavior, steering, vehicle speed, building, sky, motor vehicle, pedestrians, bicycles and so on, wherein environment may be a parent tag of the building. Quantization of these tags may be classified into two cases: one is a proportion, a proportion of the building in a frame, and the other is number/value, e.g., the number of pedestrians in a frame and a current vehicle speed.

As shown in FIG. 2, the storage of the discrete frame mainly includes three major portions, namely, sys, meta and tag. Some system data are stored in the sys. A timestamp in the meta solely identifies a frame with nanosecond as a measure unit, and travel_id is used to solely identify each travel task. The tag usually includes a plurality of tag values, namely, a discrete frame usually corresponds to a plurality of tag values, e.g., the current vehicle speed, the number of pedestrians in the frame, and the proportion of the building in the frame.

Polling query may be performed on the to-be-processed first discrete frames respectively with respect to any second tag in the at least one first tag. Which discrete frames are regarded as the to-be-processed first discrete frame depends on actual needs, for example, in the field of autonomous driving, what is formed by a camera is a series of discrete frames, and the discrete frames obtained during each travel task of the autonomous vehicle may be regarded as the to-be-processed first discrete frames.

Regarding each second tag, it is possible to determine whether the first discrete frames include a second discrete frame matched with the second tag, and, if yes, mark the matched second discrete frame with the second tag corresponding to the scene section. Preferably, it is feasible to, according to a matching rule applicable to the second tag, perform polling query on the to-be-processed first discrete frames to determine whether the first discrete frames include a second discrete frame matched with the second tag.

Specifically, when the matching rule applicable to the second tag is the range matching, if a tag value of any one of the first discrete frames corresponding to the second tag is within a range of values corresponding to the second tag, the one of the first discrete frames may be determined as the second discrete frame matched with the second tag.

When the second discrete frame is marked with the second tag corresponding to the scene section, it is possible to first determine whether there exists a scene section corresponding to the second tag, and if there does not exist the scene section corresponding to the second tag, create a scene section, corresponding to the second tag and mark the second discrete frame with the second tag corresponding to the created scene section, or if there exists the scene section corresponding to the second tag, further determine whether an adjacent preceding first discrete frame is marked with the second tag corresponding to the scene section, and if yes, mark the second discrete frame with the second tag corresponding to the scene section, the adjacent preceding first discrete frame is marked with the second tag corresponding to the scene section, or if no, create the scene section corresponding to the second tag and mark the second discrete frame with the second tag corresponding to the created scene section.

For example, the vehicle speed may be further subdivided into 0-30 km/h, 30-60 km/h, 60-90 km/h and >90 km/h. Regarding the 0-30 km/h tag (the vehicle speed may be its parent tag), it is possible to poll respective to-be-processed first discrete frame, and upon polling each first discrete frame, determine whether the current vehicle speed corresponding to the first discrete frame falls within a range of 0-30 km/h, and if no, continue to poll next first discrete frame, or if yes, further determine where there exists a scene section corresponding to the tag 0-30 km/h, and if there does not exit, create a scene section corresponding to the tag 0-30 km/h and regard the first discrete frame as the determined second discrete frame and mark the determined second discrete frame with the tag corresponding to the created scene section, or if there exists, further determine whether an adjacent preceding first discrete frame is also marked with to the tag 0-30 km/h corresponding to the scene section, and if yes, regard the first discrete frame as the determined second discrete frame and mark the determined second discrete frame with the tag 0-30 km/h is corresponding to the scene section, the adjacent preceding first discrete frame is marked with the tag 0-30 km/h corresponding to the scene section, or if no, create the scene section corresponding to the tag 0-30 km/h and regard the first discrete frame as the determined second discrete frame and mark the determined second discrete frame with the tag corresponding to the created scene section.

This is illustrated by way of example;

Assuming that there are a total of 100 (might be by far larger than this number in practice) first discrete frames to be polled, the frames are sequentially numbered as discrete frame 1-discrete frame 100 according to the obtainment time.

When the discrete frame 1 is polled, it is found that the current vehicle speed corresponding to the discrete frame is within a range of 0-30 km/h, the frame needs to be marked with the tag 0-30 km/h corresponding to the scene section. However, at this time, there is not yet the scene section corresponding to the tag 0-30 km/h. Hence, it is necessary to create a scene section corresponding to the tag 0-30 km/h, and mark the discrete frame 1 with the tag corresponding to the created scene section.

To facilitate expression, the above scene section is referred to as scene section a, and it is assumed that discrete frames 1-20 are all marked with the tag corresponding to the scene section a.

When the discrete frame 20-discrete frame 25 are polled, it is found that, the current vehicle speeds corresponding to these discrete frames are all not within the range of 0-30 km/h, e.g., are all within a range of 30-60 km/h, and then the discrete frame 20-discrete frame 25 will not be marked with the tag corresponding to the scene section a.

Then, when discrete frame 26 is polled, it is found that the current vehicle speed corresponding to the discrete frame is within a range of 0-30 km/h, and the frame needs to be marked with the tag 0-30 km/h corresponding to the section. At this time, although there already exists the scene section a, an adjacent preceding discrete frame, namely, discrete frame 25, is not marked with the tag corresponding to the scene section a, i.e., an interruption occurs. Therefore, it is necessary to create a scene section corresponding to the tag 0-30 km/h, e.g., scene section b, and mark the discrete frame 26 with the tag corresponding to the scene section b.

Then, when discrete frame 27 is polled, it is found that the current vehicle speed corresponding to the discrete frame is within a range of 0-30 km/h, and the frame needs to be marked with the tag 0-30 km/h corresponding to the section. At this time, the scene section a and scene section b are already stored, and the adjacent preceding discrete frame, namely, discrete frame 26, is marked with the tag corresponding to the scene section b, so the discrete frame 27 is marked with the tag corresponding to the scene section b.

In this way, the polling may be performed until the discrete frame 100 so that the scene sections corresponding to a plurality of tags 0-30 km/h may be obtained.

Regarding each second tag, when the matching rule applicable to the second tag is the threshold matching, if the tag value of the first discrete value corresponding to the second tag is greater than the threshold corresponding to the second tag; the first discrete frame may be determined as the second discrete frame matched with the second tag.

When the second discrete frame is marked with the second tag corresponding to the scene section, it is possible to first determine whether there exists the scene section corresponding to the second tag, and create a scene section corresponding to the second tag and mark the second discrete frame with the tag corresponding to the created scene section if there does not exist the scene section corresponding to the second tag, or further determine whether an adjacent preceding first discrete frame is marked with the tag corresponding to the scene section if there exists the scene section corresponding to the second tag, and if yes, mark the second discrete frame with the second tag corresponding the scene section, the adjacent preceding first discrete frame is marked with the second tag corresponding to the scene section, or if no, create a scene section corresponding to the second tag, and mark the second discrete frame with the second tag corresponding to the created scene section.

As compared with the range matching, the threshold matching does not involve distinguishing according to the range any more but comparing with the threshold directly. The discrete frames greater than the threshold are combined into the scene is section, and the discrete frames smaller than or equal to threshold are filtered away.

This is illustrated by way of example:

Assuming that there are a total of 100 discrete frames to be polled, the frames are sequentially numbered as discrete frame 1-discrete frame 100 according to the obtainment time.

When the discrete frame 1 is polled, it is found that the building in the discrete frame accounts for 20%, greater than 10%, and then it may be believed that there is the building in the discrete frame and the frame needs to be marked with the building corresponding to the scene section. However, at this time, there does not yet, exits the scene section, corresponding to the tag building, so it is necessary to create a scene section corresponding to the tag building, and mark the discrete frame 1 with the tag building corresponding to the created scene section.

To facilitate expression, the above scene section is referred to as scene section c, and it is assumed that discrete frames 1-20 are all marked with the tag corresponding to the scene section c.

When the discrete frame 20-discrete frame 25 are polled, it is found that the proportions of the building in these discrete frames are all smaller than 10%, and the discrete frame 20-discrete frame 25 will not be marked with the tag corresponding to the scene section c.

Then, when discrete frame 26 is polled, it is found that the proportion of the building in the discrete frame is greater than 10%, and the frame needs to be marked with the tag building corresponding to the scene section. At this time, although there already exists the scene section c, an adjacent preceding discrete frame, namely, discrete frame 25, is not marked with the tag corresponding to the scene section c, i.e., an interruption occurs. Therefore, it is necessary to create a scene section corresponding to the tag building, e.g., scene section d, and mark the discrete frame 26 with the building tag corresponding to the scene section d.

Then, when discrete frame 27 is polled, it is found that the proportion of the building in the discrete frame is greater than 10%, and the frame needs to be marked with the tag building corresponding to the section. At this time, the scene section c is and scene section d are already stored, and the adjacent preceding discrete frame, namely, discrete frame 26, is marked with the tag corresponding to the scene section d, so the discrete frame 27 is marked with the tag corresponding to the scene section d.

In this way, the polling may be performed until the discrete frame 100 so that the scene sections corresponding to a plurality of tag buildings may be obtained.

When the obtained scene sections are stored, it is possible to store a start frame timestamp and an end frame timestamp in the scene section, and use the start frame timestamp and end frame timestamp to identify the discrete frames included by the scene section. The start frame timestamp refers to a timestamp of the first frame with the earliest timestamp in the scene section, and the end frame timestamp refers to a timestamp of the last frame with the latest timestamp in the scene section.

As shown in FIG. 2, the storage of the scene section mainly includes three major portions, namely, sys, meta and tag. Some system data are stored in the sys. Begin_time in meta is the start frame timestamp in the scene section, namely, the start time of the scene section, and end_time is the end frame timestamp in the scene section, namely, an end time of the scene section.

In this storage manner, it is unnecessary to store the discrete frame data in the scene section any more, thereby greatly saving the storage of resources and reducing the storage costs.

It can be seen from the above introduction that regarding each second tag, it is possible to obtain one or more scene sections corresponding to the second tag, and furthermore determine whether the scene sections corresponding to the second tag includes a scene section whose time length is smaller than a first time length, and if yes, regard the scene section whose time length is smaller than the first time length as a fragment section, and combine the fragment section to an adjacent non-fragment section. A specific value of the first time length may depend on actual needs, e.g. 2 s. If a time interval between the start frame timestamp and the end frame timestamp of a certain scene section is smaller than 2 s, the scene section may be believed as the fragment section.

The fragment section is not of much value to actual processing, and increases the storage and management burden, so smoothing and, combination process may be performed on the fragment section.

Specifically, as for each fragment section in the scene sections corresponding to a certain second tag, any of the following processing manners or any combination thereof may be employed:

1) if there exists a non-fragment section adjacent to the fragment section only before the fragment section in the scene sections corresponding to the second tag, and the time interval between the end frame timestamp of the non-fragment section and the start frame timestamp of the fragment section is smaller than a second time length, combine the fragment section with the non-fragment section.

Furthermore, the start frame timestamp of the non-fragment section is regarded as the start frame timestamp of the combined scene section, and the end frame timestamp of the fragment section is regarded as the end frame timestamp of the combined scene section. The specific value of the second time length may also depend on actual needs, e.g., 3 seconds.

For example, assuming that the second tag corresponds to a total of three scene sections, namely, scene section a, scene section b and scene section c, wherein the scene section a corresponds to discrete frame 1-discrete frame 20, the scene section b corresponds to discrete frame 30-discrete frame 60, and the scene section c corresponds to discrete frame 62-discrete frame 63. Assuming that the scene section c is a fragment section and assuming that the time interval between the end frame timestamp of the scene section b and the start frame timestamp of the scene section c is smaller than the second time length, the scene section c may be combined into the scene section b to obtain the combined scene section b', and the scene section b' corresponds to the discrete frame 30-discrete frame 63, i.e., the start frame timestamp of the scene section b' is the timestamp of the discrete frame 30, and the end frame timestamp is the timestamp of the discrete frame 63.

2) if there exists a non-fragment section adjacent to the fragment section only after the fragment section in the scene sections corresponding to the second tag, and the time interval between the start frame timestamp of the non-fragment section and the end frame timestamp of the fragment section is smaller than a second time length, combine the fragment section with the non-fragment section.

Furthermore, the end frame timestamp of the non-fragment section is regarded as the end frame timestamp of the combined scene section, and the start frame timestamp of the fragment section is regarded as the start frame timestamp of the combined scene section.

For example, assuming that the second tag corresponds to a total of three scene sections, namely, scene section a, scene section b and scene section c, wherein the scene section a corresponds to discrete frame 1-discrete frame 2, the scene section b corresponds to discrete frame 4-discrete frame 30, and the scene section c corresponds to discrete frame 40-discrete frame 60. Assuming that the scene section a is a fragment section and assuming that the time interval between the end frame timestamp of the scene section a and the start frame timestamp of the scene section b is smaller than the second time length, the scene section a may be combined into the scene section b to obtain the combined scene section b', and the scene section b' corresponds to the discrete frame 1-discrete frame 30.

3) if there exists a non-fragment section adjacent to the fragment section before and after the fragment section in the scene sections corresponding to the second tag, the time interval between the end frame timestamp of the non-fragment section before the fragment section and the start frame timestamp of the fragment section is smaller than a second time length, and the time interval between the start frame timestamp of the non-fragment section after the fragment section and the end frame timestamp of the fragment section is smaller than the second time length, a non-fragment section with a longer time length may be selected from two adjacent non-fragment sections, and the fragment section may be combined with the selected non-fragment section.

If the selected non-fragment section is before the fragment section, the start frame timestamp of the selected non-fragment segment is regarded as the start frame timestamp of the combined scene section, and the end frame timestamp of the fragment section is regarded as the end frame timestamp of the combined scene section; if the selected non-fragment section is after the fragment section, the end frame timestamp of the selected non-fragment segment is regarded as the end frame timestamp of the combined scene section, and the start frame timestamp of the fragment section is regarded as the start frame timestamp of the combined scene section For example, assuming that the tag corresponds to a total of three scene sections, namely, scene section a, scene section b and scene section c, wherein the scene section a corresponds to discrete frame 1-discrete frame 30, the scene section b corresponds to discrete frame 32-discrete frame 33, and the scene section c corresponds to discrete frame 35-discrete frame 40. Assuming that the scene section b is a fragment section and assuming that the time interval between the end frame timestamp of the scene section a and the start frame timestamp of the scene section b is smaller than the second time length, and the time interval between the end frame timestamp of the scene section b and the start frame timestamp of the scene section c is smaller than the second time length, the scene section a with a longer time length may be selected from the scene section a and scene section c, and the scene section b may be combined into the scene section a to obtain the combined scene section a', and the scene section a' corresponds to the discrete frame 1-discrete frame 33.

In the above storage manner, it is further possible to enable search with respect to the scene section in the present embodiment, e.g., obtain a search request carrying at least one tag, determine the scene section corresponding to the tag, and generate a search result according to the stored start frame timestamp information and end frame timestamp information of the scene section, and return the search result.

If the search request only carries one tag, the start frame timestamp and end frame timestamp of the scene section corresponding to the tag may be returned as the search result. If the search request carries N tags, N being a positive integer greater than one, it is possible to determine an intersection of scene sections corresponding to N different tags in time, and return a start time and an end time of the intersection as the search result.

FIG. 3 is a schematic diagram of a determined intersection according to the present disclosure. As shown in FIG. 3, assuming that the search request carries two tags, namely, tag a and tag h, wherein tag a corresponds to three scene sections, tag b corresponds to two scene sections, the intersection of the scene sections corresponding to tag a and tag b in time may be determined, namely, a time period 1 and a time period 2 shown in FIG. 3, and then, the start time and the end time of the time period 1 and the start time and end time of the time period 2 may be returned.

Subsequently, the user sending the search request may obtain the corresponding discrete frame data according to the returned time information.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In one word, according to the solution of the present disclosure, when the scene section corresponding to the tag is stored, the start frame timestamp and end frame timestamp in the scene section may be stored, the discrete frames included in the scene section may be identified with the start frame timestamp and the end frame timestamp, so that dual storage of the discrete frames and the scene sections needn't be performed, thereby saving the storage resources and reducing the storage cost. Furthermore, based on the storage manner, the user may efficiently and accurately search to obtain the desired data and ensure the search performance.

The above introduces the method embodiments. The solution of the present disclosure will be further described through an apparatus embodiment.

Figure 4:
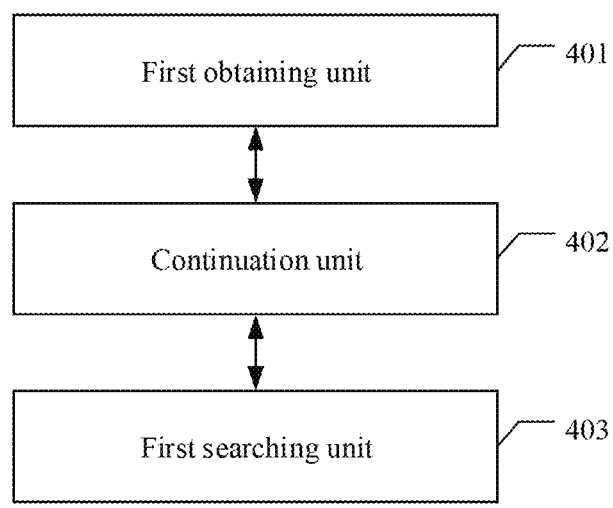
FIG. 4 is a block diagram of an apparatus for implementing a discrete frame-based scene section according to an embodiment of the present disclosure.

FIG. 4 is a block diagram of an apparatus for implementing a discrete frame-based scene section according to an embodiment of the present disclosure. As shown in FIG. 4, the apparatus comprises: a first obtaining unit 401 and a continuation unit 402.

The first obtaining unit 401 is configured to obtain at least one first tag for mapping a discrete frame to a scene section;

The continuation unit 402 is configured to, for any second tag in the at least one first tag, perform polling query on to-be-processed first discrete frames respectively to determine whether there is a second discrete frame matched with the second tag in the first discrete frames, and if there is the second discrete frame, mark the matched second discrete frame with the second tag corresponding to a scene section, and if the polling query corresponding to the second tag ends, store start frame timestamp information and end frame timestamp information of the corresponding scene section.

The first obtaining unit 401 may obtain a tag for mapping the discrete frames to the scene section from a tag repository. The tag repository stores at least one configured first tag, each first tag is marked with whether to perform mapping from the discrete frames to the scene section, or it is believed by default that each first tag needs to perform mapping from the discrete frames to the scene section.

The tag repository may further store a matching rule applicable for each first tag. Correspondingly, as for any second tag in the at least one first tag, the continuation unit 402 may, according to a matching rule applicable to the second tag, perform polling query on the to-be-processed first discrete frames to determine whether the first discrete frames include a second discrete frame matched with the second tag.

When the applicable matching rule is range matching, the tag repository may further store a range of values corresponding to, the first tag. Regarding any second tag in the at least one first tag, if determining that a tag value of any one of the first discrete frames corresponding to the second tag is within a range of values corresponding to the second tag, the continuation unit 402 determines the one of the first discrete frames as the second discrete frame matched with the second tag.

When the applicable matching rule is threshold matching, the tag repository may further store a threshold corresponding o the first tag. Regarding any second tag in the at least one first tag, if determining that a tag value of any one of the first discrete frames corresponding to the second tag is greater than a threshold corresponding to the second tag, the continuation unit 402 determines the one of the first discrete frames as the second discrete frame matched with the second tag.

Upon marking the second discrete frame with the second tag corresponding to the scene section, the continuation unit 402 may first determine whether there exists a scene section corresponding to the second tag, and if there does not exist the scene section corresponding to the second tag, create a scene section corresponding to the second tag and mark the second discrete frame with the second tag corresponding to the created scene section, or if there exists the scene section corresponding to the second tag, further determine whether an adjacent preceding first discrete frame is marked with the second tag corresponding to the scene section, and if yes, mark the second discrete frame with the second tag corresponding to the scene section, the adjacent preceding first discrete frame is marked with the tag corresponding to the scene section, or if no, create the scene section corresponding to the second tag and mark the second discrete frame with the second tag corresponding to the created scene section.

The continuation unit 402 may further determine whether the scene sections corresponding to the second tag includes a scene section whose time length is smaller than a first time length, and if yes, regard the scene section whose time length is smaller than the first time length as a fragment section, and combine the fragment section to an adjacent non-fragment section.

Specifically, upon determining that there exists a non-fragment section adjacent to the fragment section only before the fragment section in the scene sections corresponding to the second tag, and a time interval between an end frame timestamp of the non-fragment section and a start frame timestamp of the fragment section is smaller than a second time length, the continuation unit 402 combines the fragment section with the non-fragment section, and regards the start frame timestamp of the non-fragment section as the start frame timestamp of the combined scene section, and regards the end frame timestamp of the fragment section as the end frame timestamp of the combined scene section;

and/or, upon determining that there exists a non-fragment section adjacent to the fragment section only after the fragment section in the scene sections corresponding to the second tag, and the time interval between the start frame timestamp of the non-fragment section and the end frame timestamp of the fragment section is smaller than a second time length, the continuation unit 402 combines the fragment section with the non-fragment section, and regards the end frame timestamp of the non-fragment section as the end frame timestamp of the combined scene section, and regards the start frame timestamp of the fragment section as the start frame timestamp of the combined scene section;

and/or, upon determining that there exists a non-fragment section adjacent to the fragment section before and after the fragment section in the scene sections corresponding to the second tag, the time interval between the end frame timestamp of the non-fragment section before the fragment section and the start frame timestamp of the fragment section is smaller than a second time length, and the time interval between the start frame timestamp of the non-fragment section after the fragment section and the end frame timestamp of the fragment section is smaller than the second time length, the continuation unit 402 selects a non-fragment section with a longer time length from two adjacent non-fragment sections, and combines the fragment section with the selected non-fragment section. If the selected non-fragment section is before the fragment section, the start frame timestamp of the selected non-fragment segment is regarded as the start frame timestamp of the combined scene section, and the end frame timestamp of the fragment section is regarded, as the end frame timestamp of the combined scene section; if the selected non-fragment section is after the fragment section, the end frame timestamp of the selected non-fragment segment is regarded as the end frame timestamp of the combined scene section, and the start frame timestamp of the fragment section is regarded as the start frame timestamp of the combined scene section.

The apparatus shown in FIG. 4 may further comprise: a first searching unit 403 configured to obtain a search request carrying at least one tag, determine the scene section corresponding to the tag, and generate a search result according to the stored start frame timestamp information and end frame timestamp information of the scene section and return the search result.

If the search request only carries one tag, the first searching unit 403 may return the start frame timestamp and end frame timestamp of the scene section corresponding to the tag as the search result. If the search request carries N tags, N being a positive integer greater than one, the first searching unit 403 may determine an intersection of scene sections corresponding to N different tags in time, and return a start time and an end time of the intersection as the search result.

Figure 5:
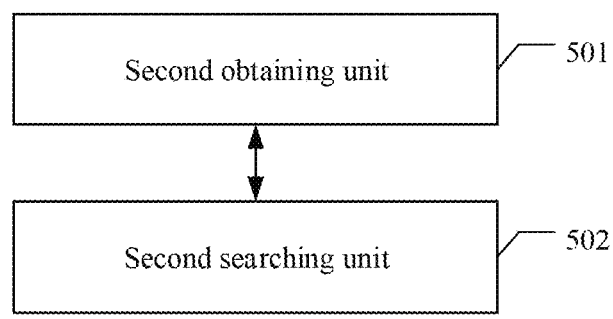
FIG. 5 is a block diagram of a scene section searching apparatus according to an embodiment of the present disclosure.

FIG. 5 is a block diagram of a scene section searching apparatus according to an embodiment of the present disclosure. As shown in FIG. 5, the apparatus comprises: a second obtaining unit 501 and a second searching unit 502.

The second obtaining unit 501 is configured to obtain a search request carrying at least one tag.

The second searching unit 502 is configured to:
determine a scene section corresponding to the tag, the scene section being formed by, after obtaining at least one first tag for mapping a discrete frame to the scene section:
  performing polling query on to-be-processed first discrete frames respectively with respect to any second tag in the at least one first tag; and
  marking a second discrete frame with the second tag corresponding to the scene section, wherein the second discrete frame exists in the first discrete frames and is matched with the second tag;

generate a search result according to the stored start frame timestamp information and end frame timestamp information of the scene section corresponding to the tag and return the search result.

If the search request only carries one tag, the second searching unit 502 may return the start frame timestamp and end frame timestamp of the scene section corresponding to the tag as the search result. If the search request carries N tags, N being a positive integer greater than one, the second searching, unit 502 may determine an intersection of scene sections corresponding to N different tags in time, and return a start time and an end time of the intersection as the search result.

A specific workflow of the apparatus embodiment shown in FIG. 4 and FIG. 5 will not be detailed any more here, and reference may be made to corresponding depictions in the above method embodiment.

Figure 6:
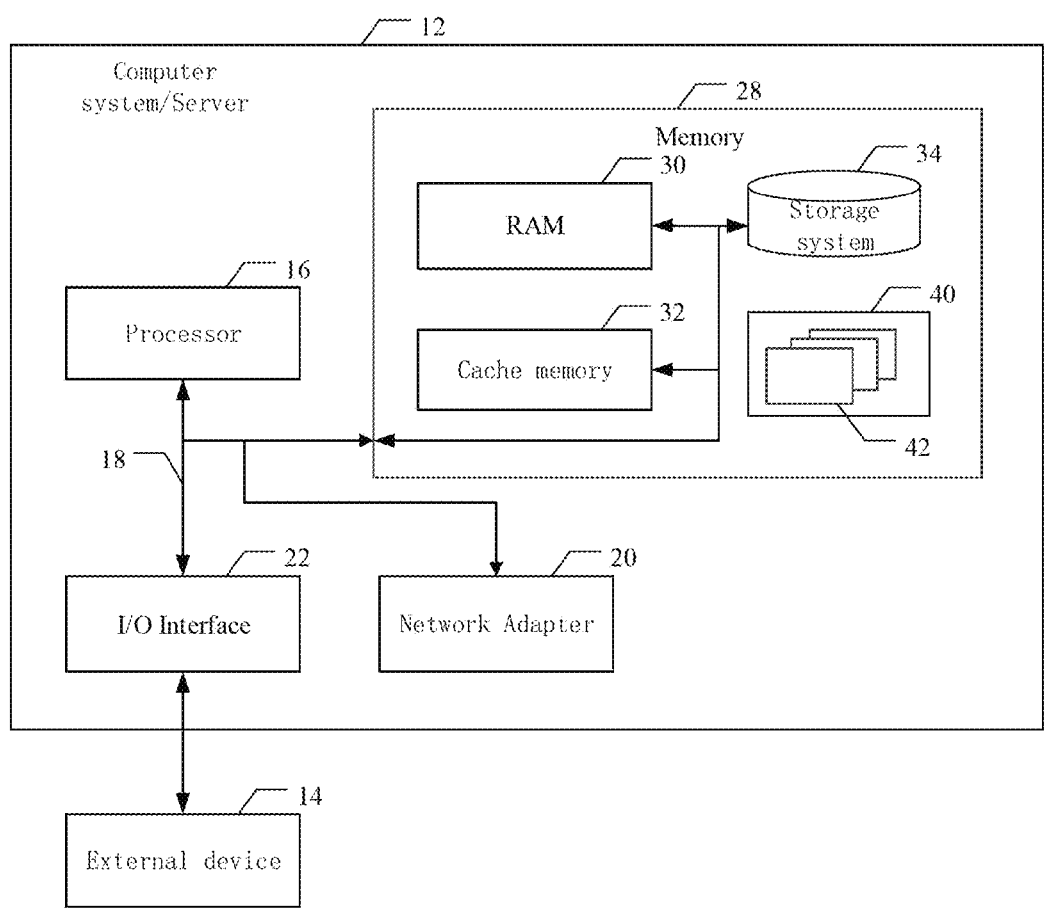
FIG. 6 illustrates a block diagram of an example computer system/server 12 adapted to implement an implementation mode of the present disclosure.

FIG. 6 illustrates a block diagram of an example computer system/server 12 adapted to implement an implementation mode of the present disclosure. The computer system/server 12 shown in FIG. 6 is only an example and should not bring about any limitation to the function and scope of use of the embodiments of the present disclosure.

As shown in FIG. 6, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can, be provided for reading from and writing to a non-removable, non-volatile magnetic media (not shown in FIG. 6 and typically called a "hard drive"). Although not shown in FIG. 6, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 6, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running, programs stored in the memory 28, for example, implement the method in the embodiments shown in FIG. 1.

The present disclosure meanwhile provides a computer-readable storage medium on which a computer program is stored, the program, when executed by the processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in a continuation unit, or they can be separate physical presences; or two or more units can be integrated in one unit. The integrated unit described above can be implemented in the form of hardware, or they can, be implemented with hardware plus software functional units.

The aforementioned integrated unit in the form of software function units may be stored in a computer readable storage medium. The aforementioned software function units are stored in a storage medium, including several instructions to instinct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A computer-implemented method for implementing a discrete frame-based scene section, the discrete frame-based scene section comprising a series of discrete frames which are obtained by an image acquisition device and made continuous to form a section having a corresponding tag, wherein the method comprises:
    obtaining at least one first tag for mapping a discrete frame to a scene section;
    for any second tag among the at least one first tag, performing polling query on to-be-processed first discrete frames respectively to determine whether there is a second discrete frame matched with the second tag in the first discrete frames;
    in a case that there is the second discrete frame, marking the second discrete frame with the second tag corresponding to the scene section;
    in a case that the execution of the polling query corresponding to the second tag is completed, storing only data of the scene section and start frame timestamp information and end frame timestamp information of the scene section, excluding a requirement of storing the discrete frames included in the scene section; and
    obtaining a search request carrying at least one tag;
    determining the scene section corresponding to the at least one tag;
    returning the start frame timestamp and the end frame timestamp of the scene section corresponding to the at least one tag to identify the discrete frames included in the scene section with the start frame timestamp and the end frame timestamp.

2. The method according to claim 1, wherein
the method further comprises: determining whether the scene sections corresponding to the second tag includes the scene section whose time length is smaller than a first time length, and upon determining that the scene sections corresponding to the second tag includes a scene section whose time length is smaller than a first time length, combining the scene section, which is regarded as a fragment section, to an adjacent non-fragment section.

3. The method according to claim 2, wherein
the combining the fragment section to an adjacent non-fragment section comprises:
    in a case that there exists the non-fragment section adjacent to the fragment section only before the fragment section in the scene sections corresponding to the second tag, and a time interval between the end frame timestamp of the non-fragment section and a start frame timestamp of the fragment section is smaller than a second time length, combining the fragment section with the non-fragment section;
    and/or, in a case that there exists the non-fragment section adjacent to the fragment section only after the fragment section in the scene sections corresponding to the second tag, and the time interval between the start frame timestamp of the non-fragment section and the end frame timestamp of the fragment section is smaller than a second time length, combining the fragment section with the non-fragment section;
    and/or, in a case that there exists the non-fragment section adjacent to the fragment section before and after the fragment section in the scene sections corresponding to the second tag, the time interval between the end frame timestamp of the non-fragment section before the fragment section and the start frame timestamp of the fragment section is smaller than a second time length, and the time interval between the start frame timestamp of the non-fragment section after the fragment section and the end frame timestamp of the fragment section is smaller than the second time length, selecting the non-fragment section with a longer time length from two adjacent non-fragment sections, and combining the fragment section with the selected non-fragment section.

4. The method according to claim 1, wherein
the performing polling query on to-be-processed first discrete frames respectively to determine whether there is a second discrete frame matched with the second tag in the first discrete frames comprises:
according to a matching rule applicable to the second tag, performing polling query on the to-be-processed first discrete frames to determine whether the first discrete frames include a second discrete frame matched with the second tag.

5. The method according to claim 4, wherein
in a case that the matching rule applicable to the second tag is range matching, the determining whether the first discrete frames include a second discrete frame matched with the second tag comprises:
in a case that a tag value of any one of the first discrete frames corresponding to the second tag is within a range of values corresponding to the second tag, determining the one of the first discrete frames as the second discrete frame matched with the second tag.

6. The method according to claim 5, wherein
in a case that the matching rule applicable to the second tag is threshold matching, the determining whether the first discrete frames include a second discrete frame matched with the second tag comprises:
in a case that a tag value of any one of the first discrete frames corresponding to the second tag is greater than a threshold corresponding to the second tag, determining the one of the first discrete frames as the second discrete frame matched with the second tag.

7. The method according to claim 6, wherein
the marking the second discrete frame with the second tag corresponding to the scene section comprises:
determining whether there exists the scene section corresponding to the second tag;
in a case that there does not exist the scene section corresponding to the second tag, creating the scene section corresponding to the second tag and marking the second discrete frame with the second tag corresponding to the created scene section.

8. The method according to claim 1, wherein
in a case that the search request only carries one tag, the generating a search result according to the stored start frame timestamp information and end frame timestamp information of the scene section and returns the search result comprises:
returning the start frame timestamp and the end frame timestamp of the scene section corresponding to the tag as the search result.

9. The method according to claim 1, wherein
in a case that the search request carries N tags, N being a positive integer greater than one, the generating a search result according to the stored start frame timestamp information and the end frame timestamp information of the scene section and returns the search result comprises:
determining an intersection of scene sections corresponding to N different tags in time;
returning a start time and an end time of the intersection as the search result.

10. A computer device, comprising a memory, a processor and a computer program which is stored on the memory and runs on the processor, wherein the processor, upon executing the program, implements a method for implementing a discrete frame-based scene section, the discrete frame-based scene section comprising a series of discrete frames which are obtained by an image acquisition device and made continuous to form a section having a corresponding tag, wherein the method comprises:
obtaining at least one first tag for mapping a discrete frame to a scene section;
for any second tag among the at least one first tag, performing polling query on to-be-processed first discrete frames respectively to determine whether there is a second discrete frame matched with the second tag in the first discrete frames;
in a case that there is the second discrete frame, marking the second discrete frame with the second tag corresponding to the scene section;
in a case that the execution of the polling query corresponding to the second tag is completed, storing only data of the scene section and start frame timestamp information and end frame timestamp information of the scene section, excluding a requirement of storing the discrete frames included in the scene section; and
obtaining a search request carrying at least one tag;
determining the scene section corresponding to the at least one tag;
returning the start frame timestamp and the end frame timestamp of the scene section corresponding to the at least one tag to identify the discrete frames included in the scene section with the start frame timestamp and the end frame timestamp.

11. The computer device according to claim 10, wherein
the method further comprises: determining whether the scene sections corresponding to the second tag includes the scene section whose time length is smaller than a first time length, and upon determining that the scene sections corresponding to the second tag includes a scene section whose time length is smaller than a first time length, combining the scene section, which is regarded as a fragment section, to an adjacent non-fragment section.

12. The computer device according to claim 11, wherein
the combining the fragment section to an adjacent non-fragment section comprises:
in a case that there exists the non-fragment section adjacent to the fragment section only before the fragment section in the scene sections corresponding to the second tag, and a time interval between the end frame timestamp of the non-fragment section and a start frame timestamp of the fragment section is smaller than a second time length, combining the fragment section with the non-fragment section;
and/or, in a case that there exists the non-fragment section adjacent to the fragment section only after the fragment section in the scene sections corresponding to the second tag, and the time interval between the start frame timestamp of the non-fragment section and the end frame timestamp of the fragment section is smaller than a second time length, combining the fragment section with the non-fragment section;
and/or, in a case that there exists the non-fragment section adjacent to the fragment section before and after the fragment section in the scene sections corresponding to the second tag, the time interval between the end frame timestamp of the non-fragment section before the fragment section and the start frame timestamp of the fragment section is smaller than a second time length, and the time interval between the start frame timestamp of the non-fragment section after the fragment section and the end frame timestamp of the fragment section is smaller than the second time length, selecting the non-fragment section with a longer time length from two adjacent non-fragment sections, and combining the fragment section with the selected non-fragment section.

13. The computer device according to claim 10, wherein the performing polling query on to-be-processed first discrete frames respectively to determine whether there is a second discrete frame matched with the second tag in the first discrete frames comprises:
according to a matching rule applicable to the second tag, performing polling query on the to-be-processed first discrete frames to determine whether the first discrete frames include a second discrete frame matched with the second tag.

14. The computer device according to claim 13, wherein in a case that the matching rule applicable to the second tag is range matching, the determining whether the first discrete frames include a second discrete frame matched with the second tag comprises:
in a case that a tag value of any one of the first discrete frames corresponding to the second tag is within a range of values corresponding to the second tag, determining the one of the first discrete frames as the second discrete frame matched with the second tag.

15. The computer device according to claim 14, wherein in a case that the matching rule applicable to the second tag is threshold matching, the determining whether the first discrete frames include a second discrete frame matched with the second tag comprises:
in a case that a tag value of any one of the first discrete frames corresponding to the second tag is greater than a threshold corresponding to the second tag, determining the one of the first discrete frames as the second discrete frame matched with the second tag.

16. A non-transitory computer-readable storage medium on which a computer program is stored, wherein the program, when executed by a processor, implements a method for implementing a discrete frame-based scene section, the discrete frame-based scene section comprising a series of discrete frames which are obtained by an image acquisition device and made continuous to form a section having a corresponding tag, wherein the method comprises:
obtaining at least one first tag for mapping a discrete frame to a scene section;
for any second tag among the at least one first tag, performing polling query on to-be-processed first discrete frames respectively to determine whether there is a second discrete frame matched with the second tag in the first discrete frames;
in a case that there is the second discrete frame, marking the second discrete frame with the second tag corresponding to the scene section;
in a case that the execution of the polling query corresponding to the second tag is completed, storing only data of the scene section and start frame timestamp information and end frame timestamp information of the scene section, excluding a requirement of storing the discrete frames included in the scene section; and
obtaining a search request carrying at least one tag;
determining the scene section corresponding to the at least one tag;
returning the start frame timestamp and the end frame timestamp of the scene section corresponding to the at least one tag to identify the discrete frames included in the scene section with the start frame timestamp and the end frame timestamp.

17. The non-transitory computer-readable storage medium according to claim 16, wherein
the method further comprises: determining whether the scene sections corresponding to the second tag includes the scene section whose time length is smaller than a first time length, and upon determining that the scene sections corresponding to the second tag includes a scene section whose time length is smaller than a first time length, combining the scene section, which is regarded as a fragment section, to an adjacent non-fragment section.

18. The non-transitory computer-readable storage medium according to claim 17, wherein
the combining the fragment section to an adjacent non-fragment section comprises:
in a case that there exists the non-fragment section adjacent to the fragment section only before the fragment section in the scene sections corresponding to the second tag, and a time interval between the end frame timestamp of the non-fragment section and a start frame timestamp of the fragment section is smaller than a second time length, combining the fragment section with the non-fragment section;
and/or, in a case that there exists the non-fragment section adjacent to the fragment section only after the fragment section in the scene sections corresponding to the second tag, and the time interval between the start frame timestamp of the non-fragment section and the end frame timestamp of the fragment section is smaller than a second time length, combining the fragment section with the non-fragment section;
and/or, in a case that there exists the non-fragment section adjacent to the fragment section before and after the fragment section in the scene sections corresponding to the second tag, the time interval between the end frame timestamp of the non-fragment section before the fragment section and the start frame timestamp of the fragment section is smaller than a second time length, and the time interval between the start frame timestamp of the non-fragment section after the fragment section and the end frame timestamp of the fragment section is smaller than the second time length, selecting the non-fragment section with a longer time length from two adjacent non-fragment sections, and combining the fragment section with the selected non-fragment section.

19. The method according to claim 6, wherein
the marking the second discrete frame with the second tag corresponding to the scene section comprises:
determining whether there exists the scene section corresponding to the second tag;
in a case that there exists the scene section corresponding to the second tag, determining whether an adjacent preceding first discrete frame is marked with the second tag corresponding to the scene section;
upon determining that an adjacent preceding first discrete frame is marked with the second tag corresponding to the scene section, marking the second discrete frame with the second tag corresponding to the scene section with which the adjacent preceding first discrete frame is marked.

20. The method according to claim 6, wherein
the marking the second discrete frame with the second tag corresponding to the scene section comprises:
determining whether there exists the scene section corresponding to the second tag;
in a case that there exists the scene section corresponding to the second tag, determining whether an adjacent preceding first discrete frame is marked with the second tag corresponding to the scene section;
upon determining that an adjacent preceding first discrete frame is not marked with the second tag corresponding to the scene section, creating the scene section corresponding to the second tag and marking the second discrete frame with the second tag corresponding to the created scene section.

* * * * *